United States Patent
Blessitt et al.

(10) Patent No.: US 10,042,113 B2
(45) Date of Patent: Aug. 7, 2018

(54) EDGELIT LIGHTING FIXTURE AND ASSEMBLY

(71) Applicant: Cooper Technologies Company, Houston, TX (US)

(72) Inventors: James H. Blessitt, Peachtree City, GA (US); Russ Clements, Americus, GA (US); Ellis W. Patrick, Sharpsburg, GA (US)

(73) Assignee: Cooper Technologies Company, Houston, TX (US)

( * ) Notice: Subject to any disclaimer, the term of this patent is extended or adjusted under 35 U.S.C. 154(b) by 94 days.

(21) Appl. No.: 14/815,288

(22) Filed: Jul. 31, 2015

(65) Prior Publication Data

US 2015/0378081 A1    Dec. 31, 2015

Related U.S. Application Data

(63) Continuation of application No. 13/788,827, filed on Mar. 7, 2013, now Pat. No. 9,110,216.
(Continued)

(51) Int. Cl.
*G02F 1/1333*    (2006.01)
*F21V 8/00*    (2006.01)
(Continued)

(52) U.S. Cl.
CPC .............. *G02B 6/009* (2013.01); *F21S 8/026* (2013.01); *G02B 6/0013* (2013.01);
(Continued)

(58) Field of Classification Search
CPC .... F21S 8/026; F21Y 2115/10; G02B 6/0013; G02B 6/0068; G02B 6/0073;
(Continued)

(56) References Cited

U.S. PATENT DOCUMENTS 4,789,224 A * 12/1988 Bougsty .............. G02B 6/0046
                                                         349/149
5,040,098 A    8/1991 Tanaka et al.
(Continued)

FOREIGN PATENT DOCUMENTS

DE    202011003171    5/2011
EP         0846915      6/1998
(Continued)

OTHER PUBLICATIONS

Office Action for Chinese Patent Application No. 201380069330.X dated Nov. 30, 2016.
(Continued)

*Primary Examiner* — Peggy Neils
(74) *Attorney, Agent, or Firm* — King & Spalding LLP

(57) ABSTRACT

Embodiments described herein are directed to a lighting fixture including a lightguide that distributes light from a major surface, a light assembly including light sources arranged linearly, and a frame including a means for providing a force that urges the light assembly against an edge of the lightguide. A standoff or spacer can provide an air gap between a light source of the light assembly and the waveguide edge. In various embodiments, the lighting fixture may incorporate a spring, a spring finger, a spring clip, a screw, or other means for securing the light assembly against the edge of the lightguide. In this manner, substantially all light provided by the light assembly is emitted into the edge of the lightguide. The fixture is formed to accommodate tolerances among elements of the lighting fixture, while maintaining the light assembly securely against the edge of the lightguide.

18 Claims, 6 Drawing Sheets

Related U.S. Application Data

(60) Provisional application No. 61/723,587, filed on Nov. 7, 2012.

(51) Int. Cl.
 *F21S 8/02* (2006.01)
 *F21Y 115/10* (2016.01)

(52) U.S. Cl.
 CPC ......... *G02B 6/0068* (2013.01); *G02B 6/0073* (2013.01); *G02B 6/0078* (2013.01); *G02B 6/0091* (2013.01); *F21Y 2115/10* (2016.08)

(58) Field of Classification Search
 CPC .... G02B 6/0078; G02B 6/009; G02B 6/0088; G02B 6/0091
 See application file for complete search history.

(56) References Cited

U.S. PATENT DOCUMENTS

| | | | |
|---|---|---|---|
| 6,161,939 A | 12/2000 | Bansbach | |
| 6,697,130 B2 | 2/2004 | Weindorf et al. | |
| 7,377,682 B2* | 5/2008 | Chang | G02B 6/0091 349/58 |
| 7,918,600 B2 | 4/2011 | Nagata et al. | |
| 8,419,258 B2 | 4/2013 | Park | |
| 8,465,192 B2* | 6/2013 | Byoun | G02B 6/0068 362/612 |
| 8,690,412 B2* | 4/2014 | Franklin | G02B 6/0073 362/612 |
| 8,770,816 B2* | 7/2014 | Parker | F21S 2/005 362/608 |
| 8,794,811 B2 | 8/2014 | Germain et al. | |
| 8,944,662 B2* | 2/2015 | Thompson | F21V 3/049 362/613 |
| 2003/0007348 A1 | 1/2003 | Loga et al. | |
| 2007/0159853 A1* | 7/2007 | Xu | G02B 6/0013 362/633 |
| 2010/0073959 A1 | 3/2010 | Hamada | |
| 2012/0062816 A1 | 3/2012 | Tsubaki | |
| 2012/0120326 A1* | 5/2012 | Takata | G02B 6/0061 348/790 |
| 2012/0182482 A1 | 7/2012 | Byoun et al. | |
| 2012/0188485 A1* | 7/2012 | Cheon | G02B 6/0068 349/65 |

FOREIGN PATENT DOCUMENTS

| | | |
|---|---|---|
| EP | 0846915 A1 | 10/1998 |
| EP | 1132678 | 9/2001 |
| EP | 2431653 | 3/2012 |
| KR | 101191748 | 10/2012 |
| KR | 101191748 B1 | 10/2012 |
| RU | 2179935 | 2/2002 |
| WO | WO 2007049847 | 5/2007 |
| WO | WO 2012117782 | 9/2012 |

OTHER PUBLICATIONS

European Search Report dated Jul. 8, 2016 for EP 13852913.6.
International Search Report for PCT/US2013/068781 dated Mar. 20, 2014.

* cited by examiner

EDGELIT LIGHTING FIXTURE AND ASSEMBLY

CROSS REFERENCE TO RELATED APPLICATIONS

The present application is a continuation of and claims priority to U.S. patent application Ser. No. 13/788,827, titled "Edgelit Lighting Fixture and Assembly," and filed on Mar. 7, 2013, which claims priority to U.S. Provisional Patent Application No. 61/723,587 filed Nov. 7, 2012 in the name of James H. Blessit, Russ Clements, and Ellis W. Patrick and entitled "Edgelit Lighting Fixture and Assembly," the entire contents of which are hereby incorporated herein by reference.

TECHNICAL FIELD

Embodiments described herein generally relate to lighting fixtures and, more particularly, to assembly solutions for an edgelit lighting fixture.

BACKGROUND

With greater adoption of Light Emitting Diode (LED) light sources in lighting fixtures, new lighting fixtures have begun incorporating alternative means for casting, distributing, and reflecting light as compared to conventional fixtures. In turn, new assembly considerations need to be taken into account for new lighting fixtures, such as edgelit lighting fixtures. On one hand, low tolerances and loose fits facilitate economical manufacturing and service; but on the other hand, high tolerances and tight fits promote optical efficiency and visual appeal. Addressing such competing objectives represents a need in the art. In this representative context, embodiments described herein relate to assembly solutions for lighting fixtures, including edgelit fixtures.

SUMMARY

A lighting system can comprise a lightguide that receives, guides, and distributes light. In certain embodiments, the lightguide can comprise a substantially piece of optical material that may be rectangular, square, circular, triangular, or some other appropriate shape or geometric form. The piece of optical material can be flat, slightly curved, or have another appropriate profile or geometry. The lightguide can be mounted to a frame. A light source can couple light into one or more edges of the lightguide. The coupled light can propagate in the lightguide and emit from a major surface of the lightguide, thereby distributing and spreading the light. The lightguide and/or the frame can be sized to provide dimensional tolerance. For example, the frame can have an opening for accepting the lightguide, with the opening somewhat larger than the lightguide. One or more elements can take up, mitigate, or otherwise compensate for the dimensional tolerance and promote efficient transfer of light between the light source and the lightguide. For example, a screw, spring, finger, clip, or other appropriate member can urge the light source and the edge of the lightguide together. Urging the light source and the edge of the lightguide together can comprise moving or pressing the light source, moving or pressing the lightguide, or moving or pressing the light source and the lightguide, for example. The member that does the urging can be located near the edge of the lightguide that receives the light, near another edge of the lightguide, in or at a corner, or at some other appropriate location.

The foregoing discussion of lighting systems is for illustrative purposes only. Various aspects of the present technology may be more clearly understood and appreciated from a review of the following detailed description of the disclosed embodiments and by reference to the drawings and the claims that follow. Moreover, other aspects, systems, methods, features, advantages, and objects will become apparent to one with skill in the art upon examination of the following drawings and detailed description. It is intended that all such aspects, systems, methods, features, advantages, and objects are to be included within this description, are to be within the scope of the present technology, and are to be protected by the accompanying claims.

BRIEF DESCRIPTION OF THE FIGURES

Reference will be made below to the accompanying drawings, wherein.

Figure 1:
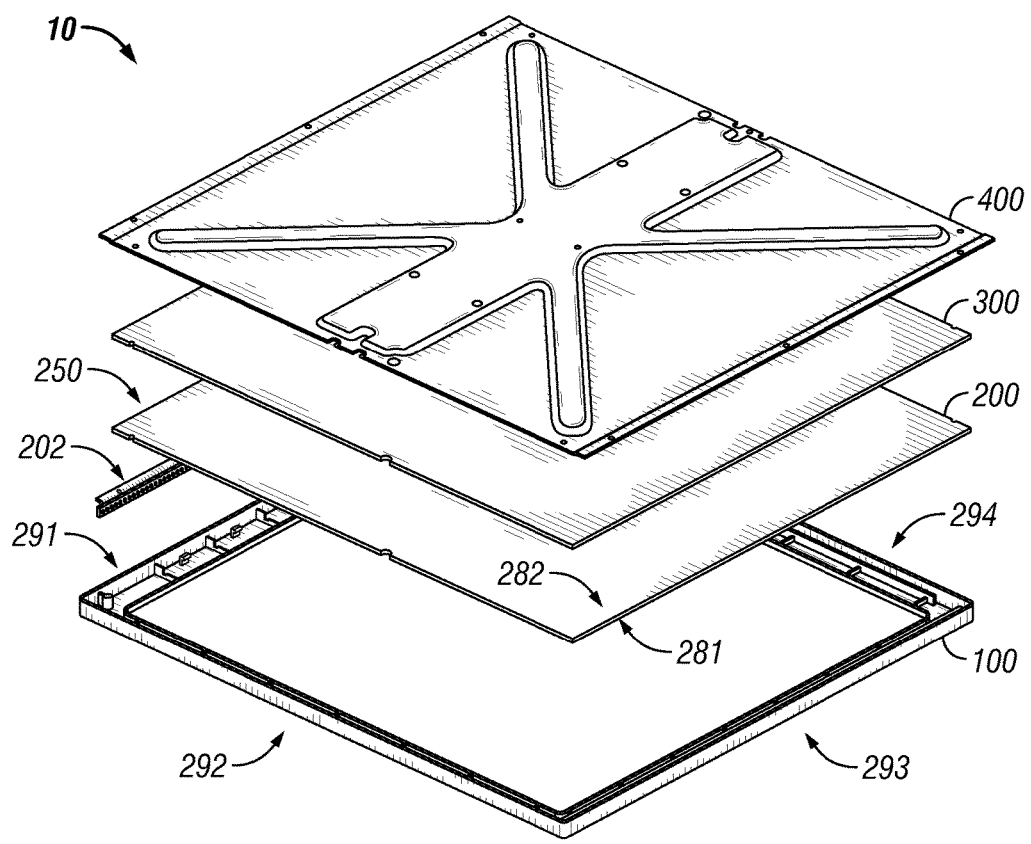
FIG. 1 is a perspective view of certain elements of a lighting fixture according to an example embodiment.

Many aspects of the technology can be better understood with reference to these drawings. The elements and features shown in the drawings are not necessarily drawn to scale, emphasis instead being placed upon clearly illustrating the principles of exemplary embodiments of the present technology. Moreover, certain dimensions may be exaggerated to help visually convey such principles. In the drawings, reference numerals designate like or corresponding, but not necessarily identical, elements throughout the several views.

DETAILED DESCRIPTION OF EXAMPLE EMBODIMENTS

A lighting system can comprise components that are dimensioned to provide ample tolerance that facilitates economical fabrication, assembly, installation, and service while achieving visual appeal, durability, and optical efficiency. The lighting system can comprise a light source and an element that receives, transmits, and emits light produced by the light source. In certain embodiments, the light source comprises one or more LEDs. In certain embodiments, the element that receives, transmits, and emits light comprises a lightguide, for example a lightguide having a generally planar format. The light source and the element can be urged together within the lighting system in a manner that takes up, mitigates, or otherwise compensates for the tolerance. In various example embodiments, the urging can come from one or more screws, springs, clips, pins, bands, elastomeric or rubber materials, or other appropriate means that is available.

The present technology can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples" or "exemplary embodiments" given herein are intended to be non-limiting and among others supported by representations of the present technology.

Turning now to the figures, FIG. 1 is a perspective view of certain elements of a lighting fixture 10 according to an example embodiment. Among other elements, the lighting fixture 10 comprises a backing tray 400, a reflector 300, a lightguide 200, a light source assembly 202, and a frame 100.

In operation, the lighting fixture 10 can illuminate an area by emitting light that reflects off the reflector 300 outward from a major surface 281 of the lightguide 200. The lighting fixture 10 may be installed as a drop-in panel of a suspended ceiling, recessed in a wall or ceiling, or mounted to a surface of a wall or ceiling, for example.

Light from the light source assembly 202 on the side 291 of the lighting fixture 10 transmits into an edge of the lightguide 200 and scatters, distributes, and/or reflects off the reflector 300, and emits from a major surface of the lightguide 200. More specifically, the coupled light from the light source assembly 202 propagates towards the opposite side 293 of the fixture 10, guided by total internal reflections off the flat major surfaces 281, 282 of the lightguide 200. Portions of the light incident on the flat major surfaces 281, 282 transmit through those surfaces 281, 282. Light transmitting through the major surface 281 is distributed to an area to be lit, for example a room. Light transmitting through the major surface 282 is directed back into the lightguide 200 by the reflector 300, for ultimate emission through the major surface 281.

In certain embodiments, the reflector 300 comprises a mirror or specularly reflective surface. In certain embodiments, the reflector 300 comprises a diffusely reflective surface such as a surface coated with flat white paint. In certain embodiments, the reflector 300 is faceted or comprises a surface relief pattern other features that promote reflection.

In one embodiment, the lighting fixture 10 includes one light source, the light source assembly 202, assembled along only one side 291 of the frame 100. Other embodiments may include additional light sources similar, substantially identical, or equivalent to the light source assembly 202 along any one, any two, or all three other sides 292, 293, 294 of the frame 100.

In various embodiments, the lighting fixture 10 may vary in shape and size. For example, although the lighting fixture 10 illustrated in FIG. 1 is nearly square in shape, lighting fixtures of triangular, square, rectangular, polygonal, circular, or other appropriate shapes are within the scope and spirit of the embodiments described herein. The lighting fixture 10 may be formed from various types of suitable materials. In certain exemplary embodiments, the frame 100 is formed from a plastic or polymer material, and the lightguide 200 is formed from a plastic, polymer, acrylic, glass, or other suitable material and may include reinforcements such as glass.

Figure 2:
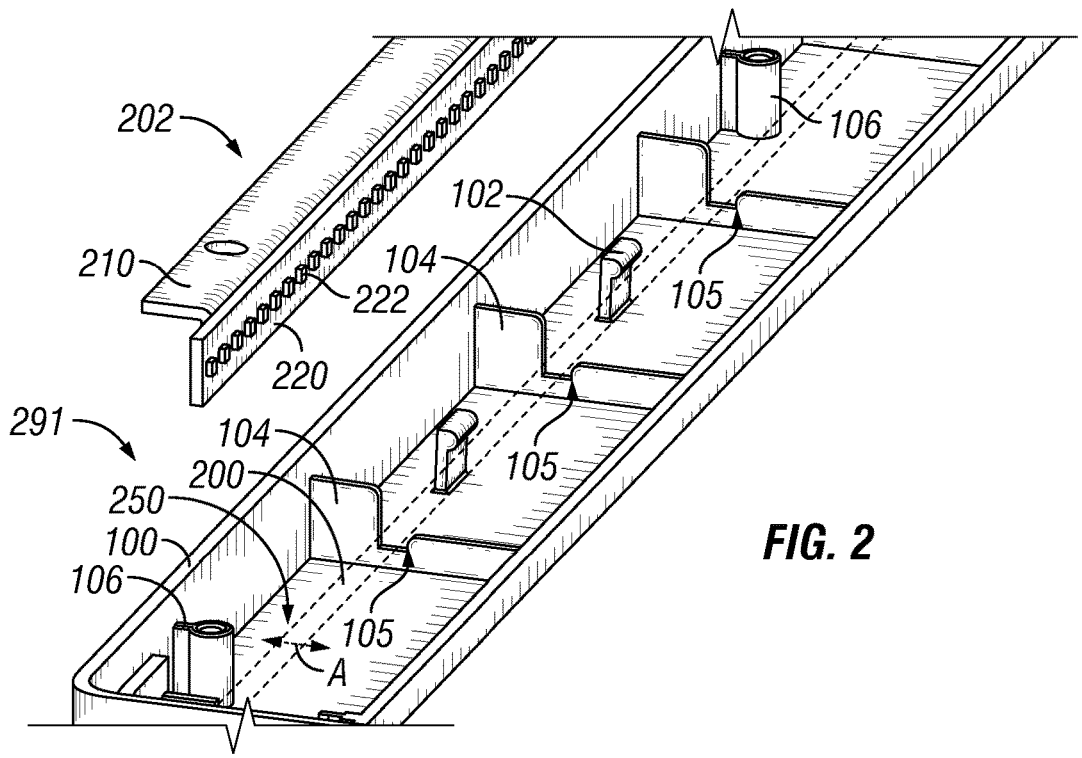
FIG. 2 is a perspective view of a section of a frame of the lighting fixture illustrated in FIG. 1 according to an example embodiment.

FIG. 2 is a perspective view of the light source assembly 202 and a section of the frame 100 of the lighting fixture 10 according to an example embodiment. As illustrated in FIG. 2, the light source assembly 202 includes a bracket 210 and a light source 220. The bracket 210 may be formed, for example, from aluminum, or another metal or metal alloy material suitable for the application, or alternatively from appropriate fiberglass or composite materials. The light source 220 is mounted or affixed to the bracket 210 using screws, snaps, adhesives, or any other suitable means for the application. The bracket 210 supports the light source 220 and also acts as a heat sink to disperse heat from the light source 220 via conduction and/or convection. In certain embodiments, the bracket 210 may comprise heat dissipating fins for thermal management.

The light source 220 may comprise a rigid printed circuit board (PCB) including electrical circuit traces that electrically couple various components such as LEDs 222 and resistors, for example. In exemplary embodiments, the LEDs 222 comprise surface mount LEDs that are generally mounted to the PCB at even or regular intervals in a substantially straight line. Alternatively, the LEDs may be irregularly or randomly spaced. In certain embodiments, the light source 220 may include a flexible-type (e.g., tape) circuit in place of a rigid PCB.

As also illustrated in FIG. 2, the frame 100 comprises a plurality of spring fingers 102, a plurality of light assembly seats 104, and a plurality of mount posts 106. As described in further detail below, the spring fingers 102 maintain a position of the light source assembly 202 against an edge of the lightguide 200, when the lighting fixture 10 is fully assembled. The spring fingers 102 are a type of spring. Each spring finger 102 can be molded at respective position on the frame 100 to provide a nominal interference with the bracket 210 of the light source assembly 202 when assembled, causing the light source assembly 202 to be pressed or compressed against the edge of the lightguide 200. In various embodiments, the spring fingers 102 are provided in pairs as illustrated in FIG. 2, and a pair of spring fingers 102 may be formed at even intervals, such as every 12 or 24 inches, along the frame 100. In certain embodiments, the spring fingers 102 are located at irregular or random intervals. In certain embodiments, the spring fingers 102 are fastened, welded, glued, or otherwise attached to the main body of the frame 100. In some embodiments, the spring fingers 102 and the main body of the frame 100 are of like material composition. Alternatively, the spring fingers 102 and the frame 100 may be made of different materials, for example one of steel and the other of fiberglass.

The term "spring finger," as used herein, generally refers to a projection that recovers its position after being bent. The term "spring fingers" is a plural form of "spring finger."

The term "spring," as used herein as a noun, generally refers to an elastic element that recovers its original shape when released after being distorted. The term "springs," as used herein as a noun, is the plural form of "spring."

As will be appreciated by those of skill in the art, an "elastic" solid is one that is capable of recovering size and shape after deformation.

The mount posts 106 provide a means for assembling the frame 100 with other elements, such as the light source assembly 202, of the lighting fixture 10. In certain embodiments, the mount posts 106 include a threaded hole to accept a screw for securing the frame 100 to the other elements of the lighting fixture 10.

To assist with alignment and positioning of the light source assembly 202 with the frame 100, each light assembly seat 104 includes a notch 105. When the light source assembly 202 is assembled with the frame 100, the light source assembly 202 rests against the light assembly seats 104. When seated upon the lighting assembly seats 104, the light source assembly 202 is provided a limited range of motion in the direction "A", as illustrated. The actual position of the light source assembly 202 on the light assembly seats 104 will vary based on the manufacturing tolerances of the frame 100 and the lightguide 200, for example, as described below. The range of motion accommodates increased manufacturing tolerance, facilitates assembly during manufacturing, and promotes field service—thereby improving economics on multiple dimensions. Additionally, the system provides tighter joints for better visual appearance and for optical efficiency.

Figure 3:
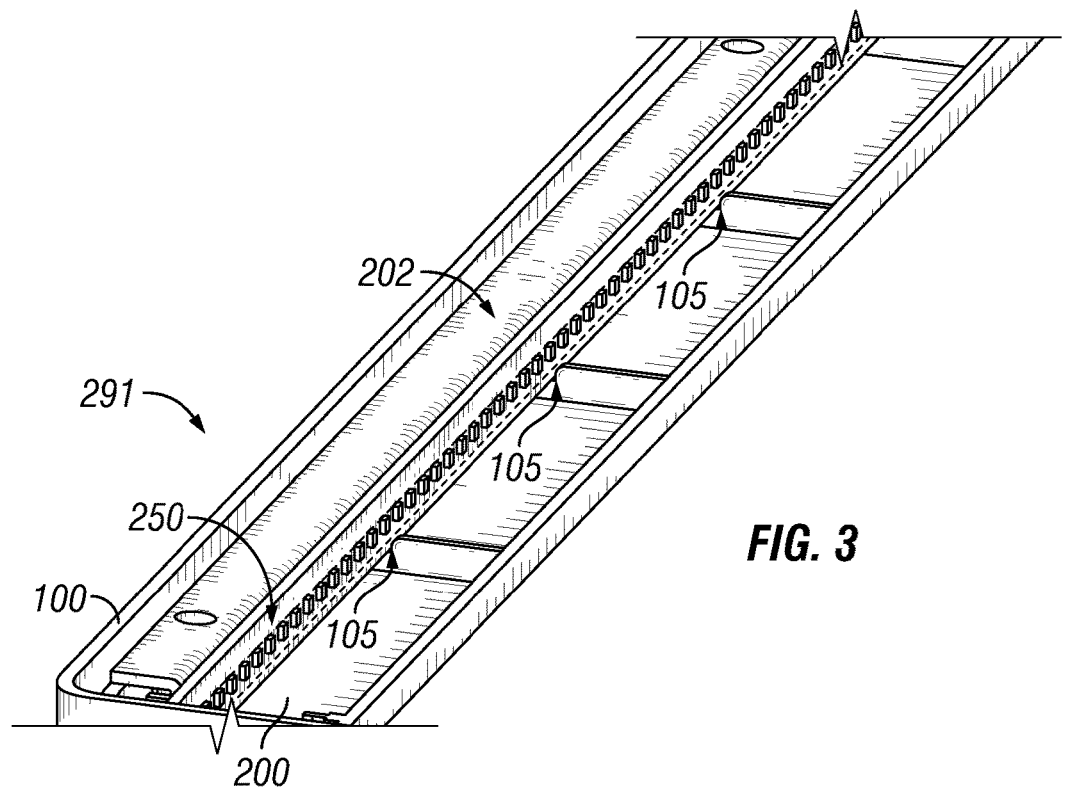
FIG. 3 is another perspective view of the frame of the lighting fixture illustrated in FIG. 1 according to an example embodiment.

FIG. 3 is another perspective view of the frame 100 of the lighting fixture 10 according to an example embodiment. FIG. 3 illustrates the light source assembly 202 when assembled with the frame 100 as discussed above (i.e., seated upon the light assembly seats 104). As can be seen in FIG. 3, once assembled, the light source 220 is aligned and secured in a position against an edge 250 of the lightguide 200. This alignment permits substantially all light from the light source assembly 202 to be emitted into the edge 250 of the lightguide 200.

Figure 4:
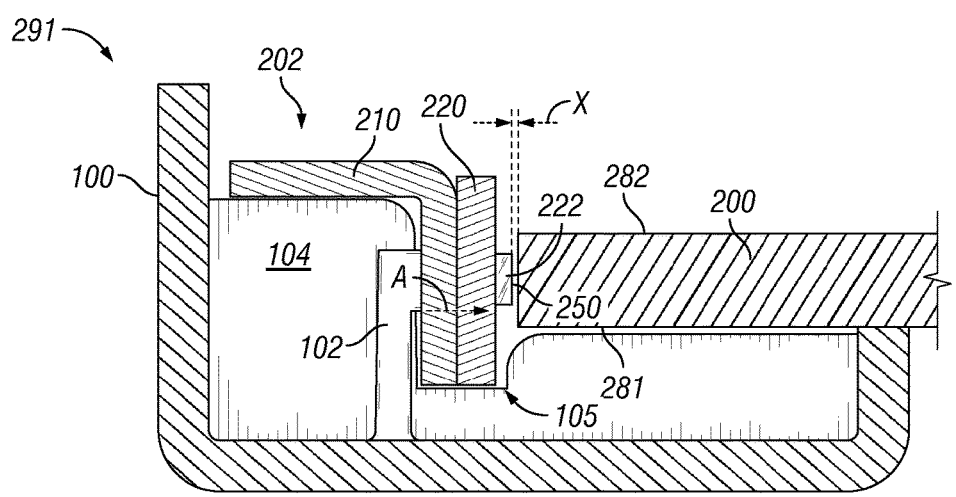
FIG. 4 is a cross-section view of the frame of the lighting fixture illustrated in FIG. 1 according to an example embodiment.

FIG. 4 is a cross-section view of the frame 100 of the lighting fixture 10 according to an example embodiment. In FIG. 4, the arrangement of the bracket 210, the light source 220, the LEDs 222 and the spring fingers 102 is illustrated. Particularly, it is noted that the spring fingers 102 are aligned to press against a back surface of the bracket 210, providing a spring force in the direction "A" toward the edge 250 of the lightguide 200. The bracket 210 and the light source 220 rest upon the light assembly seats 104, and an edge of the bracket 210 and an edge of the light source 220 occupy or fit within the notch 105. In this position, the light source assembly 202 is able to shift or slide in the direction "A" based on the spring force provided by the spring fingers 102, until resting against the edge 250 of the lightguide 200.

In certain embodiments, the LEDs 222 contact the edge 250 of the lightguide 200. In certain embodiments, the LEDs 222 are separated from the edge 250 of the lightguide 200 by a gap or standoff distance. In certain embodiments, the light source assembly 202 rests against the edge 250 of the lightguide 200 in a position with a nominal clearance "X" between the LEDs 222 and the edge 250 of the lightguide 200. The clearance "X" may be due to one or more elements mounted to the PCB of the light source 220 that are larger than the LEDs 222. That is, in certain embodiments, the light source 220 includes elements other than the LEDs 222, such as surface mount chip resistors, or one or more shims or spacers, mounted to the PCB of the light source 220. These elements may provide a gap, in the form of the nominal clearance "X," between the LEDs 222 and the edge 250 of the lightguide 200. Specifically, these elements may be greater in certain dimensions as compared to the LEDs 222 and contact the edge of the lightguide 200—resulting in the clearance "X" between the LEDs 222 and the edge 250 of the lightguide 200. In certain embodiments, the nominal clearance "X" comprises an intentional standoff of predetermined dimension.

It is noted that, based on the nominal interference between the light source assembly 202 and the spring fingers 102 when assembled, certain tolerances among the elements of the lighting fixture 10 may be accommodated. That is, certain manufacturing tolerances of the lightguide 200, the frame 100, the light source assembly 202, and other elements may be accommodated. For example, if the lightguide 200 varies for each lighting fixture 10 due to manufacturing tolerances of the lightguide 200, then the spring fingers 102, in connection with the light assembly seats 104, permit the light source assembly 202 to shift a certain distance and rest in a secured position against the edge 250 of the lightguide 200. Similarly, if manufacturing tolerances of the frame 100 cause certain frames to be slightly larger or smaller or warped, the spring fingers 102 ensure that the light source assembly 202 is secured against the edge 250 of the lightguide 200. Additionally, the nominal clearance "X" may be maintained between the light source 220 and the edge 250 of the lightguide 200 regardless of variances in the size of the lightguide 200 and/or the frame 100.

Figure 5A:
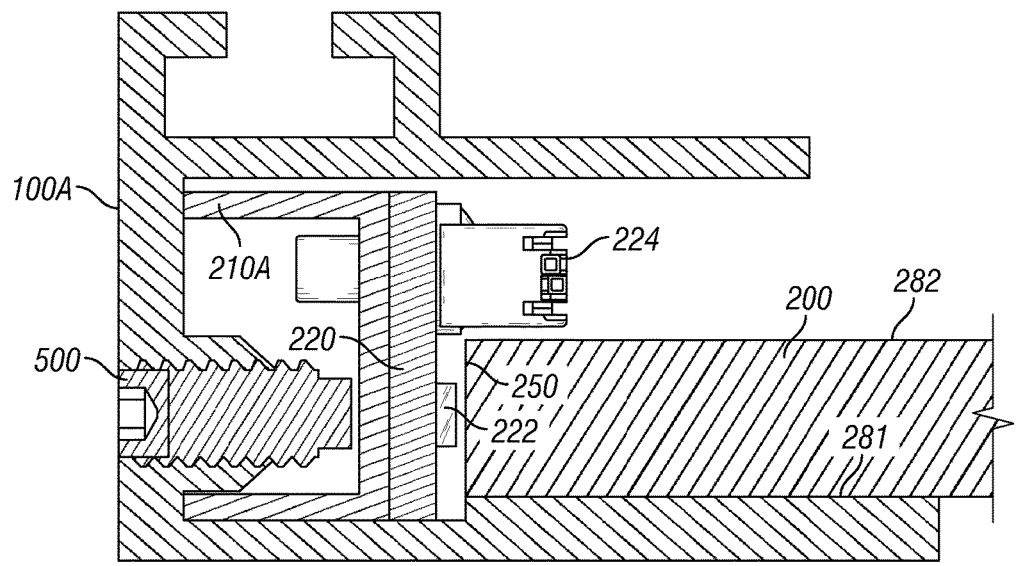
FIG. 5A is a cross-section view of a frame of a lighting fixture according to another example embodiment.

FIG. 5A is a cross-section view of a frame of a lighting fixture according to another example embodiment. The frame 100A illustrated in FIG. 5A serves a purpose similar to the frame 100 of FIG. 1 but is formed in a different cross sectional shape and, perhaps, from a different material (e.g., from extruded aluminum). In the embodiment illustrated in FIG. 5A, the light source 220 is mounted to the bracket 210A. The bracket 210A serves a purpose similar to the bracket 210 but includes three sides shown in the figure. An electrical connector 224 of the light source 220 is also illustrated in FIG. 5A. It is noted that, in various embodiments, the light source 220 may include the electrical connector 224 or, in some cases, may be connected to power directly using conductive lead lines such as wires. In an example embodiment, the frame 100A extends peripherally about the lightguide 220, i.e. around a perimeter of the lightguide 220.

Rather than using the spring finger 102 as discussed above with reference to FIGS. 1-4, the embodiment illustrated in FIG. 5A relies upon the set screw 500 to ensure that the light source 220 and the LEDs 222 mounted to the light source 220 are secured against the edge 250 of the lightguide 200. In various embodiments, the frame 100A may include one, two, or more set screws 500 along a side. It is noted that, while the spring fingers 102 are formed to automatically provide a spring force upon assembly, the set screw 500 in the embodiment illustrated in FIG. 5A is generally adjusted after initial assembly to provide a desired amount of travel and force to secure the light source 220 against the edge 250 of the lightguide 200. The set screw 200, or some other threaded element, can be advanced via manual or automated turning. The spring fingers 102 discussed above and the set screw 500 represent two example embodiments for urging the light source 220 and the lightguide 200 together.

Figure 5B:
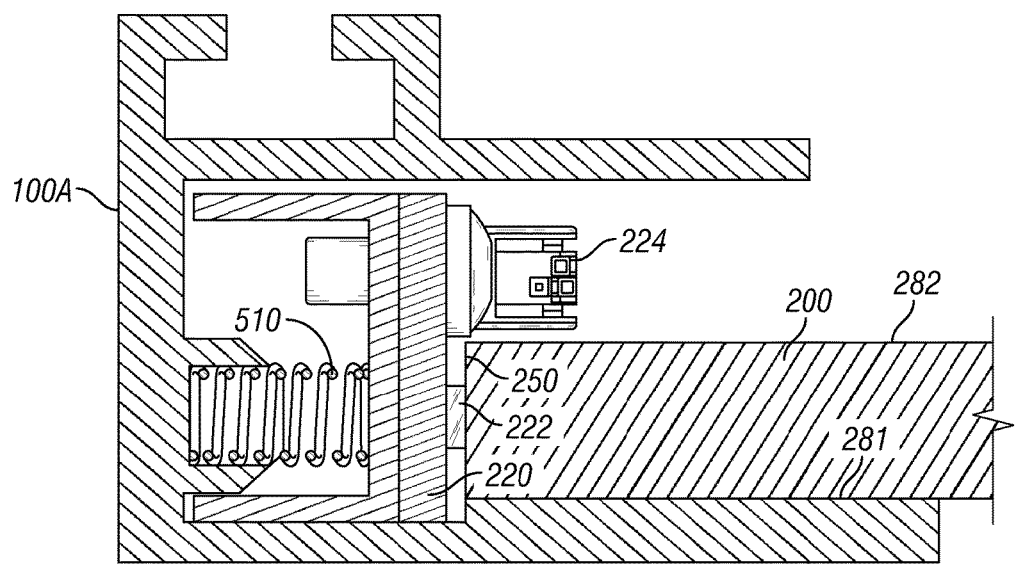
FIG. 5B is a cross-section view of a frame of a lighting fixture according to another example embodiment.

FIG. 5B is a cross-section view of a frame of a lighting fixture according to another example embodiment. The embodiment illustrated in FIG. 5B is similar to the embodiment illustrated in FIG. 5A, although incorporating one or more springs 510 in place of the set screws 500 to provide force to secure the light source 220 against the edge 250 of the lightguide 200. In the illustrated embodiment, the springs 510 comprise coils of metal wire. In various embodiments, the frame 100A may include one, two, or more springs 510 along a side at intervals that may be regular, irregular, or random, for example. In certain embodiments, a spring in the form of a rod of synthetic rubber or some other elastomeric member is substituted for the illustrated coil-based springs 510.

Figure 6:
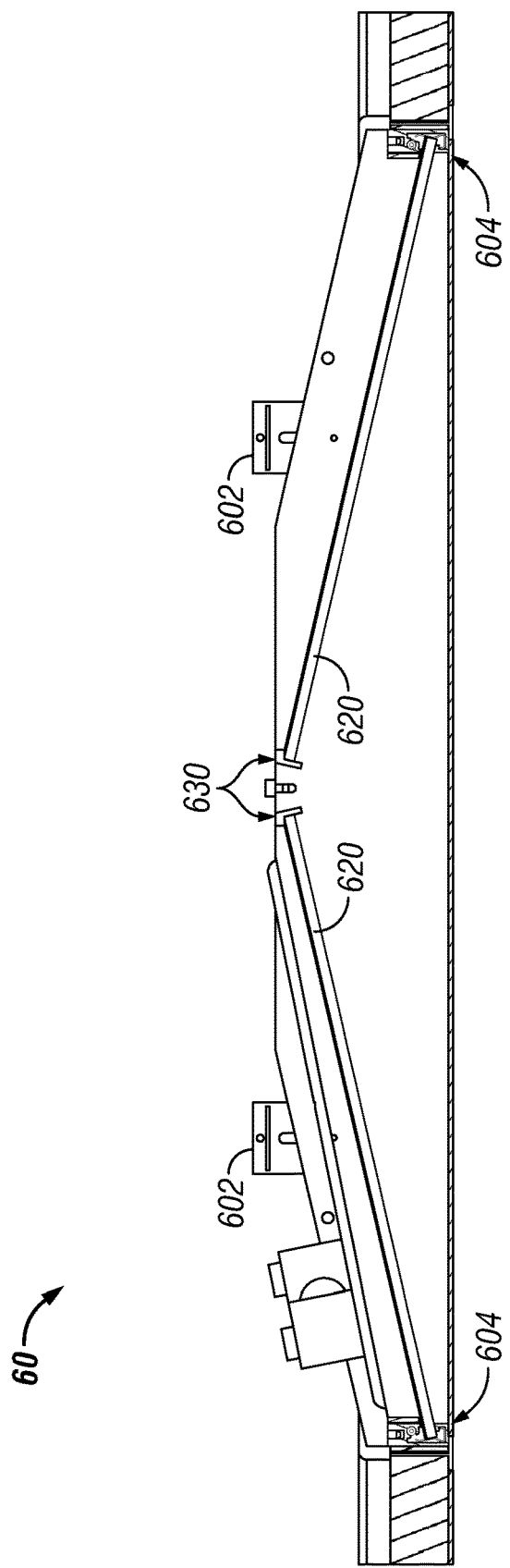
FIG. 6 is an end view cross-section view of a lighting fixture according to another example embodiment.

FIG. 6 is a cross-section view of a lighting fixture 60 according to another example embodiment. The lighting fixture 60 illustrated in FIG. 6 comprises two lightguides 620 aligned in an angled fashion. The lightguides 620 extend into the page so that the lighting fixture 60 can be considered roof-shaped. Light enters each of the lightguides at the apex of the fixture 60, flows along the lightguide plane, and exits gradually as it flows towards the lower edges. Accordingly, the lighting fixture 60 distributes light downward, softly illuminating a workspace, living area, or elsewhere.

The lighting fixture 60 includes light assemblies 630 which are similar, in certain aspects, to the light source assembly 202 discussed above. Each light assembly 630 is positioned at an apex edge of a lightguide 620. At edges of the lightguides 620 opposing the light assemblies 630, the lighting fixture 60 includes spring corners 604. The features of the spring corners 604 are further described below with reference to FIGS. 7A and 7B.

Figure 7A:
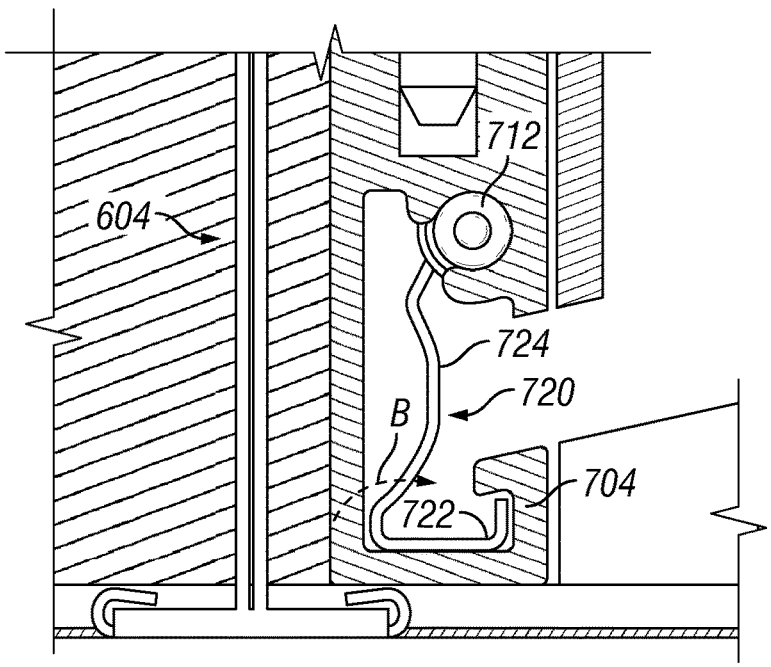
FIG. 7A is a cross-section view of a framing portion of the lighting fixture illustrated in FIG. 6 according to an example embodiment.

FIG. 7A is a cross-section view of a framing portion of the lighting fixture 60 according to an example embodiment. In FIG. 7A, elements of the spring corner 604 are illustrated. In general, the spring corner 604 comprises a framing section 704 and a spring clip 720, which is another example embodiment of a spring. In various embodiments, the framing section 704 may be formed from aluminum, plastic, or other suitable materials, and the spring clip 720 may be formed from steel, shape-memory metal alloys suitable for the application, or other suitable material or materials.

The term "spring corner," as used herein, generally refers to a corner in which or at which at least one spring is disposed. The term "spring corners," as used herein, is the plural form of "spring corner."

The term "spring clip," as used herein, generally refers to a spring that grips, clasps, or hooks. The term "spring clips," as used herein, is the plural form of "spring clip."

Functionally, the spring clip 720 urges the lightguide 620 against the light assemblies 630. As discussed above, when the lightguide 620 and the light assemblies 630 are urged together, a gap may separate the lightguide edge from the LEDs. To provide such a gap, in addition to LEDs, a circuit board may include a standoff, in the form of a shim (made of metal or electrically nonconductive material, for example) or a standard electrical component (such as a resistor or capacitor, for example). Alternatively, the LEDs and the light lightguide edge may be in physical contact with one another.

The framing section 704 includes a recess or void in which the spring clip 720 is secured. It is noted that both the framing section 704 and the spring clip 720 may extend a certain distance orthogonal to the direction of the cross-section illustrated in FIG. 7A. In certain embodiments, the spring clip 720 extends orthogonally "into the page" essentially the full length of a side the fixture 60. In certain embodiments, multiple spring clips 720 are incorporated at regular, irregular, or random intervals, for example. In certain embodiments, there are four small spring clips 720, one in each corner of the frame, that apply pressure to the light guides (such that there are two spring clips per lightguide).

A base 722 of the spring clip 720 is positioned within the recess of the framing section 704 so as to hinder the base 722 of the spring clip 720 from rotating or moving. The spring clip 720 is formed such that the arm 724 of the spring clip 720 is biased to maintain a certain angle with respect to the base 722. When inserted into the recess of the framing section, the arm 724 provides a force in the direction "B", as illustrated. The spring clip 720 may act as a leaf spring it its compression method. Before being fully assembled with the lightguide 620, the arm 724 of the spring clip 720 generally rotates in the direction B until contacting the screw 712 which prevents further movement. In certain embodiments, rather than contacting the screw 712 contact is with the back wall, and once in contact with the back wall the spring clip 720 compresses like a leaf spring.

Figure 7B:
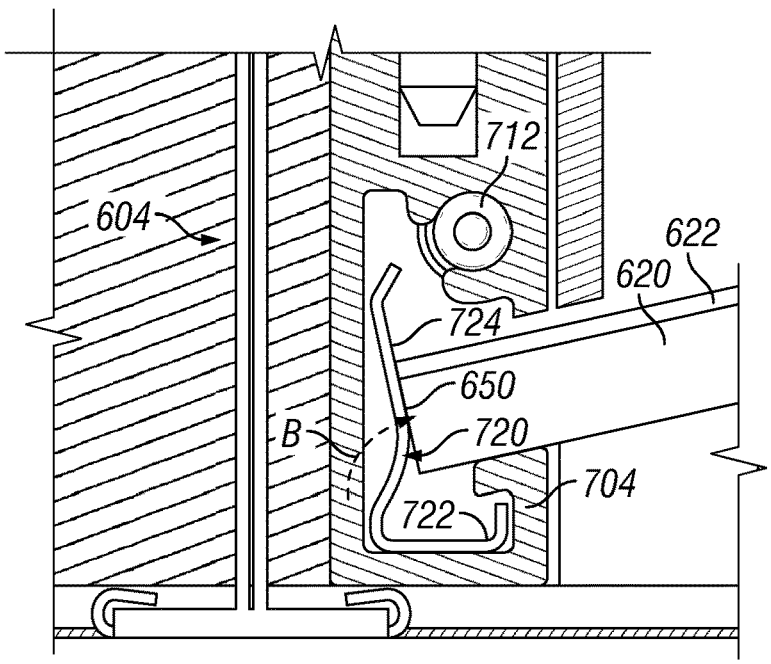
FIG. 7B is another cross-section view of a framing portion of the lighting fixture illustrated in FIG. 6 according to an example embodiment.

FIG. 7B is another cross-section view of a framing portion of the lighting fixture 60 according to an example embodiment. In FIG. 7B, the lightguide 620 has been installed with the lighting fixture 60. As illustrated, an edge 650 of the lightguide 620 extends into the recess of the framing section 704 and contacts the arm 724 of the spring clip 720. In turn, the spring clip 720 provides a force against the edge 650 in the direction B. This force results in application of a translated force on an opposing edge of the lightguide 620—the edge where a light assembly 630 is mounted. In other words, the entire lightguide 620 is pushed by the spring clip 720 to secure the lightguide 620 against the light assembly 630. This permits substantially all light from the light assembly 630 to be emitted into the edge of the lightguide 620 and accommodates fabrication tolerance as discussed above.

Technology for lighting systems has been described. From the description, it will be appreciated that an embodiment of the present technology overcomes the limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art. Therefore, the scope of the present technology is to be limited only by the claims that follow.

What is claimed is:

1. A lighting system comprising:
   a lightguide comprising two major surfaces and an edge formed between the two major surfaces, the edge comprising a first edge portion and a second edge portion;
   a light source disposed adjacent the first edge portion to couple light into the lightguide;
   a member that supports the lightguide and that extends along the second edge portion, the member comprising a recess wherein a base end of the member extends into the recess;
   a screw disposed adjacent a top end of the recess; and
   a spring comprising:
      a base portion that is disposed in the recess and adjacent the base end of the member so as to hinder the base portion of the spring from rotating or moving in the recess;
      an arm portion that extends vertically from the base portion, the arm portion configured to adjoin the second edge portion and apply a spring force to the second edge portion to urge the first edge portion towards the light source, and
      a top portion that extends from the arm portion, wherein the top portion of the spring engages the screw to prevent a default forward motion of the arm portion.

2. The lighting system of claim 1, wherein the member comprises a framing section.

3. The lighting system of claim 1, wherein the light source comprises an array of light emitting diodes.

4. The lighting system of claim 1, further comprising a second lightguide, wherein the lightguide and the second lightguide are angled relative to one another to provide an apex.

5. The lighting system of claim 1, wherein the lighting system is configured for recessed installation in a ceiling.

6. The lighting system of claim 1, wherein the spring comprises a spring clip.

7. The lighting system of claim 1, wherein the spring is one of a plurality of spring clips disposed at intervals along the second edge portion.

8. A lighting system comprising:
- a lightguide comprising two major surfaces and an edge formed between the two major surfaces;
- a light source disposed adjacent the edge to couple light into the lightguide;
- a member that supports the lightguide and extends along the edge, the member comprising a threaded aperture; and
- a threaded member that is at least partially disposed in the threaded aperture, the threaded member comprising an end that is oriented towards the light source so that rotation of the threaded member advances the end to urge the light source towards the edge such that the light source contacts the edge of the lightguide.

9. The lighting system of claim 8, wherein the threaded member comprises a set screw.

10. The lighting system of claim 8, wherein the member comprises a frame that extends around a perimeter of the lightguide.

11. The lighting system of claim 8, wherein the light source comprises a light emitting diode.

12. The lighting system of claim 8, further comprising a second lightguide, wherein the lightguide and the second lightguide are angled relative to one another to form an apex.

13. The lighting system of claim 8, wherein the threaded aperture is one of a plurality of threaded apertures disposed along the edge.

14. A lighting system comprising:
- a frame that includes:
  - a base having an inner perimeter that defines an aperture and an outer perimeter,
  - a sidewall disposed along the outer perimeter, the sidewall being substantially perpendicular to the base;
  - a plurality of light assembly seats that are disposed on the base and spaced apart from each other, each light assembly seat being substantially perpendicular to the base and including:
    - a first portion that is proximate to the outer perimeter and extending towards the inner perimeter,
    - a second portion that is proximate to the inner perimeter, and
    - a notch disposed between the first portion and second portion, and
  - one or more spring fingers that are disposed on the base and extend substantially perpendicular to the base, wherein the one or more spring fingers are spaced apart from each other and from the sidewall, and each of the one or more spring fingers is disposed between a pair of light assembly seats;
- a lightguide comprising two major surfaces and an edge formed between the two major surfaces;
- a light source bracket having a first surface and an opposite second surface; and
- a light source disposed on the first surface of the light source bracket,
  wherein the first portion of the plurality of light assembly seats support the light source bracket and the second portion of the plurality of light assembly seats support at least a portion of the lightguide such that:
  - an edge of the light source bracket and the light source fit within the notch,
  - the light source is positioned adjacent the edge of the lightguide to couple light into the lightguide,
  - at least a portion of one of the two major surfaces faces the aperture, and
  - the one or more spring fingers press against the second surface of the light source bracket to urge the light source towards the edge of the lightguide.

15. The lighting system of claim 14, wherein the light source comprises an array of light emitting diodes.

16. The lighting system of claim 14, wherein the lighting system is configured for recessed installation in a ceiling.

17. The lighting system of claim 14, wherein the one or more spring fingers are disposed at regular intervals.

18. The lighting system of claim 14, wherein the one or more spring fingers are disposed at irregular intervals.

* * * * *